July 28, 1936.　　　A. W. WESSMAN　　　2,048,907
OUTBOARD BEARING BRACKET FOR THRESHER CYLINDER SHAFTS
Filed July 5, 1935
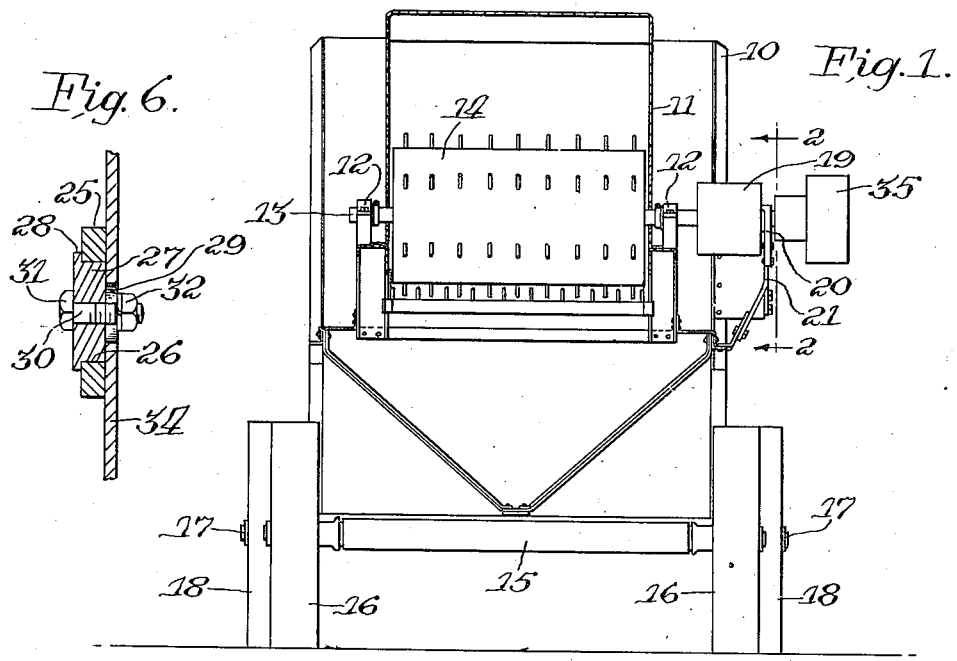
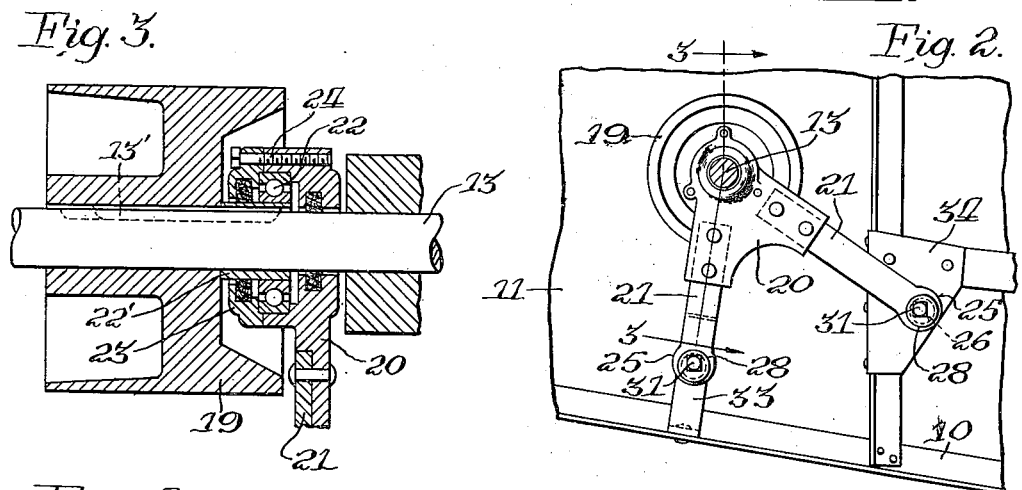
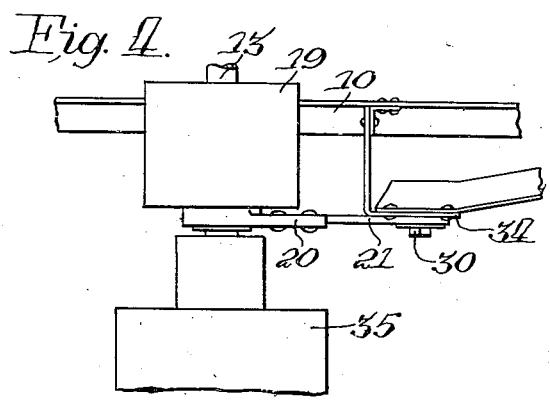
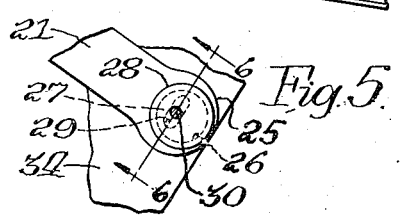

Patented July 28, 1936

2,048,907

UNITED STATES PATENT OFFICE 2,048,907

OUTBOARD BEARING BRACKET FOR THRESHER CYLINDER SHAFTS

Arnt W. Wessman, Moline, Ill., assignor to International Harvester Company, a corporation of New Jersey Application July 5, 1935, Serial No. 29,937

2 Claims. (Cl. 308—62)

This invention relates to an outboard bearing bracket support for thresher cylinder shafts of stationary threshers.

It is common practice to drive a so-called straw bruiser attachment at the straw discharge end of the machine by means of a belt and pulley drive, the power being taken from the threshing cylinder shaft at the front end of the machine. The thresher cylinder shaft extends sufficiently laterally out of the threshing machine housing to permit mounting of a second drive pulley on the extended end of the shaft, so that power may be taken therefrom by means of a belt to drive the wind stacker or a straw bruiser attachment. Such arrangement is ample for the operation of the wind stacker, but a very severe load and strain is imparted to the bearings which support the cylinder shaft when the straw bruiser is driven from the second pulley. In fact, when driving the straw bruiser, there is great danger that, with power being taken from the extended end of the shaft, the shaft will become fatigued and cause the bearings to give out. It is desirable, therefore, that, when the second pulley is being used for driving the straw bruiser attachment, an outboard bearing be provided for supporting the outer extended end of the shaft, so as properly to support said shaft to save the same and its bearings from wear and damage.

It is the main object of this invention, therefore, to provide an improved outboard bearing bracket for thresher cylinder shafts.

It is another object to provide such a shaft support including means for easily and accurately aligning the auxiliary bearing support to hold the shaft true on its axis.

It is still another object to provide a simplified means for aligning the bearing bracket with the shaft.

Other important objects will become apparent to those skilled in this art as the disclosure is more fully made.

These important objects may be achieved by the illustrative example of the invention shown in the accompanying sheet of drawings in which, briefly, a thresher is shown carrying a cylinder on a cylinder shaft, one end of said shaft extending laterally of the thresher housing and carrying an inner pulley for the reception of a belt whereby to drive the cylinder. The shaft end in question projects laterally of this inner pulley, so that a second pulley may be carried on said shaft end for the purpose of taking power from the cylinder shaft to drive, by means of a second belt, an auxiliary mechanism associated with the thresher, such for example as a straw bruiser, arranged at the straw discharge end of the thresher. The improved outboard bearing bracket embodies a pair of spaced arms which are secured at their free ends by means of an improved adjusting means to the adjacent side of the thresher. This bracket carries a bearing through which the shaft is passed whereby the outer end of said shaft is rigidly supported to prevent the same from becoming fatigued and to insure that it will run properly on a true axis.

In said drawing:

Figure 1 is a general front elevational view, partly in transverse cross section, of a thresher to show the threshing cylinder and its shaft and also the improved outboard bearing bracket operatively associated therewith;

Figure 2 is a general side elevational view of the outboard bearing support, partly in section, taken along the line 2—2 of Figure 1, looking in the direction of the arrows;

Figure 3 is a central transverse cross sectional view of the structure shown in Figure 2, and taken along the line 3—3 of Figure 2, looking in the direction of the arrows, the parts being shown on a larger scale;

Figure 4 is a detail plan view of the structure shown in Figure 2;

Figure 5 is a detail elevational view, partly in cross section, to show the improved form of adjustable lock means for aligning the bearing in the bracket with the shaft; and, Figure 6 is an enlarged sectional view through the structure shown in Figure 5, taken along the line 6—6 of Figure 5, looking in the direction of the arrows.

In Figure 1 there is shown a front view of a thresher which embodies a frame 10 including a separator housing 11, the side walls of which carry bearings 12 for journaling opposite ends of a transverse thresher cylinder shaft 13, on which is mounted the thresher cylinder 14 within the housing 11. The framework 10 and body 11 are carried on a front axle 15 including a pair of front wheels 16, while the rear end of the thresher is carried on an axle 17 journaled on a pair of rear wheels 18.

The shaft 13 has one end extending laterally of the housing 11, the extended end of said shaft carrying a main pulley wheel 19 adapted to receive a belt driven from any suitable source of power to turn the shaft 13 and the cylinder 14. The shaft 13 extends some distance laterally beyond this pulley wheel 19, and over this extended end of the shaft is slid a bifurcated bracket 20, the furcations of which carry angularly spaced arms 21. This bracket 20, as shown in Figure 3, is cup-shaped to form a housing for an antifriction bearing 22, which is secured in place by a cap 23 secured by bolts 24 to the cup-shaped part of the bracket 20. This bearing and bracket assembly is an integral unit with the arms 21, so that the bearing and bracket may be slid axially onto the shaft 13 into the position shown in Figure 3. The pulley 19 is made fast on the shaft 13 by means of a key 13', and the inner race of the bearing 22 is drive fitted over a sleeve 22', which is notched to fit over the key 13'. This arrangement obviously acts as a driver for the inner race of the bearing 22. The free end of each arm 21, as shown in Figure 5, is formed with an enlarged circular end 25, which, as shown in Figure 6, is formed with a circular opening 26 to receive a circular washer 27 having an outer flange 28. Said circular washer 27 is formed with a hole arranged off center, as shown. A bolt 30 is extended through this hole and through a slot 29 in a frame part adjacent the side wall 11, said bolt having a head 31 adapted to carry a nut 32 on the back side of the frame part for securing the washer 27 and arm 21 to the wall 11. The free end of each arm 21 is similarly constructed in the respects just mentioned. The free end of one arm 21 is connected to a bolt receiving slot 29 formed in a bracket 33, while the other arm 21 is adapted to be similarly secured to a bracket 34, as shown in Figure 2.

The end of the shaft 13 projects beyond this bearing bracket 20 and is adapted to receive a second pulley 35, which in turn is adapted to receive a belt for taking power from the shaft 13 and delivering it to an auxiliary mechanism, such as a straw bruiser, located at the straw dump end of the machine, for driving the same.

In the normal condition of use of the thresher the pulley 19 is driven from a belt to drive the shaft 13 and the cylinder 14. The pulley 35 is also on the shaft to be belt connected for driving the wind stacker. The bearing bracket structure 20—21, however, is not on the machine. When it is desired to drive the auxiliary straw bruiser, then the bracket structure 20—21 is brought into place by sliding the same over the end of the shaft 13 into the position shown in Figure 3, (the pulley 35 being first removed), whereby to provide an outboard bearing support for the shaft 13. The enlarged ends 25 of the two arms 21 are positioned over the respective bolt receiving slots 29 in the brackets 33 and 34, the eccentric washers 27 being placed to register the bolt holes therein with the adjacent respective slot 29, whereby to position the arms 21 in such a manner that the bearing 22 will be coaxially disposed with respect to the axis of the shaft 13. Thus the eccentric washers 27 provide an easy and ready means for insuring proper mounting of the bearing 22 in relation to the shaft 13. The nuts 32 are drawn tight when the bearing has been properly aligned fixedly to secure the bearing and its supporting bracket firmly in place. The outer or auxiliary pulley 35 is then fastened to the shaft 13 in position to receive a belt for driving the auxiliary straw bruiser.

By unloosening the nuts 32, it is a simple matter to swing the two arms 21 together as a unit forwardly to make it possible to slip the belt off the main pulley 19, as desired.

From this disclosure it will now be seen that an improved form of outboard bearing support has been provided for the purposes stated and that the same achieves the desirable objects heretofore recited.

It is the intention to cover all such changes and modifications of the particular example of the invention disclosed which do not constitute departures from the spirit and scope of the invention as covered by the appended claims.

What is claimed is:

1. An outboard bearing support for a thresher cylinder shaft carried horizontally in spaced main bearings disposed adjacent opposite side walls of a thresher body, the shaft having one end projected a substantial distance beyond one side wall of the body and one of the main bearings, the projected end of the shaft carrying a pair of spaced pulleys, said support comprising a bracket formed to enclose a bearing, said bearing and bracket being slipped over the said end of the shaft when the outer pulley is removed to support the shaft at a point spaced from the nearest of said main bearings and between the pulleys when both are mounted on the shaft, arms included in the bracket having their free ends angularly spaced apart and respectively located at spaced points adjacent the proximate side wall of the body, bolts passed through the free ends of the arms for securing said free ends to the body, and eccentric means operatively associated with the arms and bolts for enabling the arms to be swung with the bracket to align the bearing on the shaft.

2. An outboard bearing support for a thresher cylinder shaft carried horizontally in spaced main bearings disposed adjacent opposite side walls of a thresher body, the shaft having one end projected a substantial distance beyond one side wall of the body and one of the main bearings, the projected end of the shaft carrying a pair of spaced pulleys, said support comprising a bracket having a cup-shaped head enclosing a bearing, said bearing and bracket being slipped over the said end of the shaft when the outer pulley is removed to support the shaft at a point spaced from the nearest of said main bearings and between the pulleys when both are mounted on the shaft, arms connected with the bracket which extend angularly in spaced apart relation from the head, said arms having free ends located at spaced points adjacent the proximate side wall of the body, means passed through the free ends of the arms for securing said free ends to the body, and means operatively associated with the free ends of the arms and securing means for enabling the arms to be swung with the bracket to align the bearing on the shaft.

ARNT W. WESSMAN.